(12) United States Patent
Behrens

(10) Patent No.: US 6,739,089 B1
(45) Date of Patent: May 25, 2004

(54) VEGETATION ELEMENT

(76) Inventor: Wolfgang Behrens, Trespenmoor 25, D-27243 Gross Ippener (DE)

( * ) Notice: Subject to any disclaimer, the term of this patent is extended or adjusted under 35 U.S.C. 154(b) by 435 days.

(21) Appl. No.: 08/967,043

(22) Filed: Nov. 10, 1997

(30) Foreign Application Priority Data

Nov. 21, 1996 (DE) .......................................... 196 48 105

(51) Int. Cl.⁷ .............................................................. A01C 1/04
(52) U.S. Cl. ...................................................................... 47/56
(58) Field of Search ..................... 47/56, 65.9; 111/199

(56) References Cited

U.S. PATENT DOCUMENTS

| | | | | |
|---|---|---|---|---|
| 1,971,504 A | * | 8/1934 | Pratt ............................... | 47/56 |
| 2,243,857 A | * | 6/1941 | Fischer ............................ | 47/9 |
| 2,648,165 A | * | 8/1953 | Nestor ............................. | 47/56 |
| 2,876,588 A | * | 3/1959 | Tietz et al. ...................... | 47/58 |
| 2,923,093 A | * | 2/1960 | Allen .............................. | 47/56 |
| 2,976,646 A | * | 3/1961 | Hansen et al. .................. | 47/56 |
| 3,160,986 A | * | 12/1964 | Watson et al. .................. | 47/56 |
| 3,516,196 A | * | 6/1970 | Lippoldt et al. ................. | 47/56 |
| 3,798,836 A | * | 3/1974 | Rubens et al. .................. | 47/59 |
| 3,870,583 A | * | 3/1975 | Gidge ........................... | 156/500 |
| 3,890,910 A | * | 6/1975 | Angruner ..................... | 111/199 |
| 4,272,919 A | * | 6/1981 | Schmidt .......................... | 47/56 |
| 4,318,248 A | * | 3/1982 | Muldner ......................... | 47/56 |
| 4,364,197 A | * | 12/1982 | Baron ............................. | 47/56 |
| 4,913,596 A | * | 4/1990 | Lambert, III ................ | 405/43 |
| 4,934,094 A | * | 6/1990 | Walton ........................... | 47/56 |
| 5,189,833 A | * | 3/1993 | Clark .............................. | 47/56 |
| 5,205,068 A | * | 4/1993 | Solomou ........................ | 47/56 |
| 5,226,255 A | * | 7/1993 | Robertson ...................... | 47/56 |
| 5,390,442 A | | 2/1995 | Behrens ......................... | 47/59 |
| 5,417,010 A | * | 5/1995 | Ecer ............................... | 47/56 |
| 5,608,989 A | | 3/1997 | Behrens ....................... | 47/65.9 |
| 5,651,213 A | * | 7/1997 | Egan .............................. | 47/56 |
| 5,675,933 A | * | 10/1997 | Kawaguchi et al. ......... | 47/65.8 |
| 5,724,766 A | | 3/1998 | Behrens ......................... | 47/56 |
| 5,836,107 A | * | 11/1998 | Behrens ......................... | 47/56 |
| 5,860,245 A | * | 1/1999 | Welch ............................ | 47/56 |
| 5,887,382 A | * | 3/1999 | Marshall et al. ............... | 47/56 |

FOREIGN PATENT DOCUMENTS

| | | | | |
|---|---|---|---|---|
| DE | 2150770 | * | 4/1973 | ..................... 47/56 |
| DE | 2438301 | | 2/1976 | |
| DE | 2621332 | * | 11/1977 | ..................... 47/56 |
| DE | 3805069 | | 9/1989 | |
| DE | 3816865 | * | 11/1989 | ..................... 47/56 |
| DE | 4219275 | | 12/1993 | |
| EP | 0337085 | | 10/1989 | |
| JP | 404183323 | * | 6/1992 | ..................... 47/9 |
| WO | WO 97/01687 | | 1/1997 | |

* cited by examiner

*Primary Examiner*—Son T Nguyen
(74) *Attorney, Agent, or Firm*—Burns, Doane, Swecker & Mathis, L.L.P.

(57) ABSTRACT

A vegetation element for sodding artificial surfaces (such as roofs) or natural soil surfaces is described. The vegetation element comprises a vegetation carrier consisting made of a mineral and/or organic material for vegetation, and it has an optional bottom carrier layer. The vegetation carrier is provided with a seed mat made of a flexible, biodegradable material, and the seed mat contains seeds that are distributed uniformly at separate locations, where they are secured and held in place by the seed mat. The seed mat may be arranged on the surface of the vegetation carrier as well as on the bottom side of the vegetation carrier or in between.

13 Claims, 2 Drawing Sheets

VEGETATION ELEMENT

Figure 1:
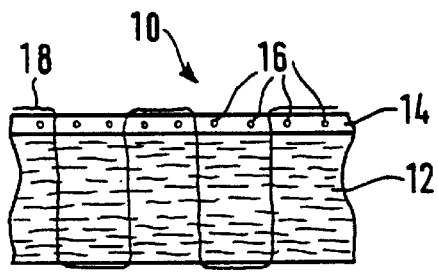

The invention relates to a vegetation element.

Vegetation elements are being produced to an increasing extent, and a preferred application consists of using them for sodding on flat or inclined roofs of both residential houses and industrial buildings.

The vegetation elements can be precultivated outside of their subsequent site of use before being laid on a roof subsequently. To this end, the vegetation carriers are laid as mat sheeting on a substrate, and seed is applied to the vegetation body. Then it is precultivated with horticultural care until the vegetation bodies have been sodded and are available as a finished vegetation element. The vegetation elements can then be rolled up into rolls and conveyed to a roof where they are then unrolled. To achieve a more reliable handling of these prefabricated vegetation elements, they usually have a water-permeable carrier layer of a nonwoven or a coarse mesh fabric on the bottom side of the vegetation carrier. Such a vegetation element is known from European Patent Application EP 706,753 A1, where the vegetation carrier is made of a mineral material in the form of a hygroscopic rock wool mat.

In addition, however, it is also possible to sod roofs directly on site and install the vegetation body directly on the roof, where in this case the bottom carrier layer mentioned above may be omitted. Seeds are again sown on the vegetation carrier, and after a certain growth period, the finished sodded vegetation element is created on the roof. In precultivation and in direct on-site sodding with these vegetation elements, seeds must be sown on the vegetation body. In practice, these seeds are applied manually by a person. It is often observed that the seeds are distributed very unevenly on the vegetation body, so there are some areas with too many seeds and other areas with very few seeds or even empty spaces where there are no seeds. This leads to uneven sodding of the vegetation element, which is a disadvantage.

When the person who sowed the seeds notices that they are not distributed evenly, that person will try to fill the empty spaces or fill up the sparsely seeded areas by applying more seeds. However, this leads to the result that more seeds are applied on the whole than would actually have been necessary for the given area of the vegetation element. Consequently, the cost of producing the vegetation elements is increased.

The object of this invention is to create a vegetation element that has uniform sodding and costs less to produce, regardless of whether the vegetation element is produced in the sense of precultivation or direct on-site sodding, and also regardless of which type of known vegetation elements is used, in other words, regardless of whether the vegetation element consists of several layers.

The basic idea of the invention consists of using a seed mat of flexible, biodegradable material. This seed mat contains individual seeds that are spaced a distance apart and are secured at certain separate locations through the seed mat and held in place there. The seed mat thus already has the seeds required for sodding, which have been arranged uniformly in advance in or on the seed mat.

Instead of sowing the seeds as before, the invention proposes that the vegetation carrier be provided with a seed mat having seeds. The known sowing of seeds is thus replaced by applying the seed mat.

Since the seeds are already distributed evenly, this also yields uniform sodding for the vegetation element in an advantageous manner. In experiments, it has been found that seed consumption can be reduced by more than 50% with this invention.

This invention can be used with precultivated vegetation elements having a bottom carrier layer as well as with vegetation elements where the vegetation carrier is installed directly on the roof, etc. In each of these cases, the process of sowing seeds is replaced by the application of a seed mat.

According to an expedient embodiment of the invention, the seed mat consists of a bottom layer and a top layer connected to it, between which the seeds are secured, and the bottom layer and the top layer are made of a nonwoven. The individual layers may be very thin and designed so that the eye can see the seeds between them and their uniform distribution.

Another expedient embodiment of the invention consists of the fact that the top layer of the seed mat is formed by an adhesive layer of a plant-compatible adhesive. Thus, in this case the seed mat consists of a bottom layer on which the seeds are distributed. Then the adhesive layer is applied as the top layer, securing the seeds and holding them in place.

According to another preferred embodiment, the seed mat comprises a bottom nonwoven carrier on which the seeds are arranged. The nonwoven carrier is then sprayed with a plant-compatible adhesive, so the seeds are secured and held in place on the nonwoven carrier.

The seed mat is arranged on top of the vegetation carrier in an expedient manner and connected to the vegetation carrier, where it is advantageous to mechanically attach the seed mat to the vegetation carrier. Joining with threads in the form of chain warp stitches, for example, is suitable for this purpose.

However, the seed mat may also be glued to the vegetation carrier with a plant-compatible adhesive in an advantageous manner.

Attaching the seed mat to the vegetation carrier eliminates the risk of the seed mat being lifted away from the vegetation body by wind, for example. High wind forces can occur especially on high roofs.

Another expedient embodiment of the invention consists of performing or supporting the attachment of the seed mat to the vegetation carrier by applying a surface load to the seed mat, by applying gravel or coarse sand/stone chips to the seed mat as an air-permeable layer.

Another expedient embodiment of the invention provides for the seed mat to be arranged on the bottom side of the vegetation carrier. This variant also yields uniform sodding of the vegetation element, where the plants grow upward through the vegetation carrier.

In another embodiment of the invention, the seed mat can be arranged not only above or below but also inside the vegetation carrier. It is advantageous to make the vegetation carrier of two separate layers with the seed mat sandwiched between them.

In an advantageous manner, the seed may also contain a uniformly distributed fertilizer in addition to the seeds, to accelerate the plant growth process.

The invention also consists of using a seed mat made of a flexible, biodegradable material provided with seeds secured and held in place at certain locations as a measure to provide the required seeds for the vegetation carrier of a vegetation element for sodding artificial surfaces (such as roofs) or natural soil surfaces.

It should be pointed out that seed mats for use in the field of horticulture are essentially known. However, these have been limited to simply laying small seed mats on natural garden soil. No large area applications of the seed mat was known, nor could any have been carried out, because of the lack of means for securing the seed mats on the garden soil surface, and seed mats have not yet been used at all with vegetation elements laid in sheets over very large areas.

Figure 2:
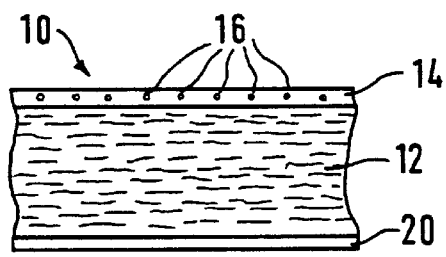
Figure 3:
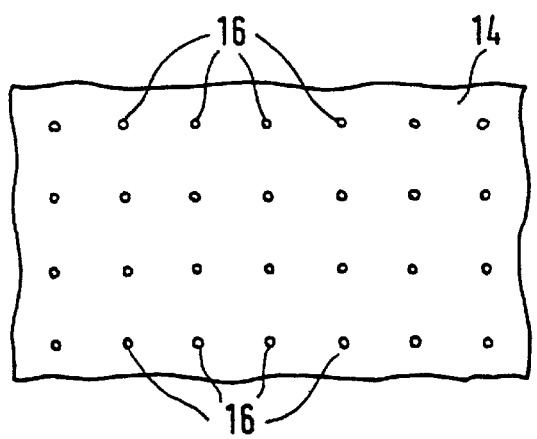
Figure 4:
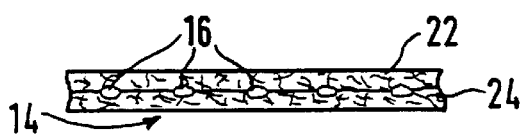
Figure 5:
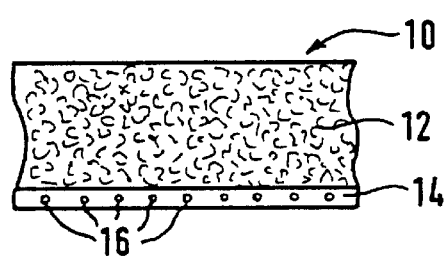

This invention is explained in greater detail below on the basis of the embodiments illustrated in the figures, which show the following:

FIG. 1: a cross-sectional view through a vegetation element according to a first embodiment, FIG. 2: a cross-sectional view through a vegetation element according to a second embodiment, FIG. 3: a top view of a seed mat, FIG. 4: a cross-sectional view through a seed mat according to FIG. 3, and FIG. 5: a cross-sectional view of a vegetation element according to another embodiment.

Many modifications of the vegetation element described so

Figure 6:
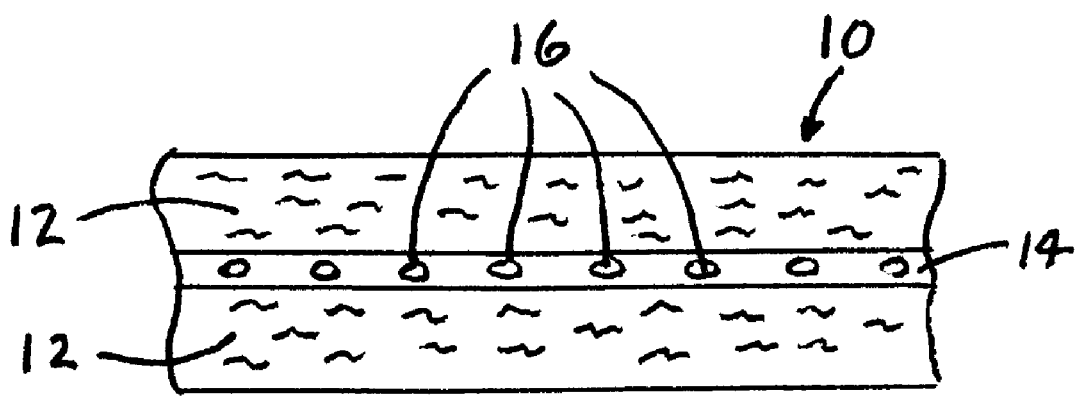

FIG. 6 illustrates a further embodiment of the vegetation element 10 of the present invention wherein seed mat 14 bearing seed 16 therein is positioned and attached between two distinct layers of vegetation carrier 12.

The embodiment of a vegetation element 10 illustrated in a partial cross-sectional view in FIG. 1 comprises a vegetation carrier 12 with a seed mat 14 on its surface. Inside this seed mat 14, seeds 16 are secured and held in place at separate selected locations. The structure of a seed mat 14 is described in greater detail below on the basis of FIGS. 3 and 4.

Vegetation carrier 12 may be made of a mineral material, such as hygroscopic rock wool. Seed mat 14 is mechanically attached to the surface of vegetation carrier 12 with a chain warp stitch with threads 18. The threads run on the surface of seed mat 14 and on the bottom side of vegetation carrier 12, and threads 18 also penetrate through vegetation element 10. This type of mechanical attachment by threads 18 is accomplished with a chain warp stitch.

In another embodiment of the vegetation element according to FIG. 2, the bottom side of vegetation carrier 12 is attached to a carrier layer 20 consisting of a water-permeable nonwoven or a coarse mesh cloth. Reliable handling of vegetation element 10 is achieved through carrier layer 20 in a known way, and it can be rolled up for the purpose of transport, and then the roll is unrolled and laid on a roof or similar surface. As already shown in FIG. 1, the vegetation element according to FIG. 2 has a seed mat 14 with seeds 16 on its surface. Seed mat 14 is glued to vegetation carrier 12 with a plant-compatible adhesive.

FIGS. 3 and 4 show the structure of a seed mat 14. The top view according to FIG. 3 shows that the seeds 16 which have been secured and held in place are uniformly distributed. According to the cross-sectional view in FIG. 4, seed mat 14 consists of a top layer 22 and a bottom layer 24 that are attached to each other, with the seeds 16 between them. Top layer 22 and bottom layer 24 are each designed as thin nonwoven layers.

Seed mat 14 may also be produced by arranging the seeds on a bottom nonwoven carrier and then applying a plant-compatible adhesive layer from above, which thus secures and holds the seeds in place and then forms the top layer of seed mat 14.

In addition, it is also possible to arrange the seeds on a bottom nonwoven carrier and then spray the nonwoven carrier and the seeds on it with a plant-compatible adhesive to secure the seeds and hold them in place.

In addition to the seeds, the seed mat may also contain fertilizer dispersed in a uniform distribution, and in the embodiment according to FIG. 4, the seed mat together with the seeds 16 is between the top layer 22 and bottom layer 24.

In the embodiment of a vegetation element 10 illustrated in FIG. 5, seed mat 14 with seeds 16 is on the bottom side of vegetation carrier 12, which is made of organic materials such as coconut, flaxseed, hemp or cotton, for example. These materials are biodegradable. far are possible within the scope of the invention. Another method of securing the seed mat to the surface of the vegetation carrier should be mentioned in particular. Thus it is possible to apply an air-permeable layer of gravel or coarse sand/rock chips to the seed mat, forming a uniform load and protecting the seed mat from being lifted by wind forces.

For fire prevention purposes, preferably a mineral material such as hygroscopic rock wool is used for the vegetation carrier. However, it is also conceivable for the vegetation carrier to consist of a mixture of mineral and organic materials.

The idea according to this invention for using a seed mat with seeds locally secured on it to eliminate the need to sow seeds by hand can essentially be implemented with all vegetation elements and is not limited to the embodiments illustrated in the figures.

What is claimed is:

1. An improved vegetation element having an upper surface and a lower surface for use when providing uniform sodding on a surface that is to receive plant growth, said vegetation element comprising a vegetation carrier layer (a) of flexible hygroscopic rock wool, and attached thereto a seed mat (b) of flexible biodegradable material which contains seeds therein that are secured and held in place at uniformly spaced locations within said seed mat, wherein said vegetation carrier layer (a) is positioned below said seed mat (b).

2. An improved vegetation element according to claim 1 wherein said seed mat (b) consists of a bottom layer attached to a top layer with said seeds being positioned between said bottom layer and said top layer where said seeds are secured and held in place at uniformly spaced locations within said seed mat (b).

3. An improved vegetation element according to claim 2 wherein said top layer of said seed mat (b) is formed of a plant-compatible adhesive.

4. An improved vegetation element according to claim 2 wherein said bottom layer of said seed mat (b) is a nonwoven carrier and the top layer of said seed mat (b) is a plant-compatible adhesive that has been applied by spraying so as to secure said seeds at uniformly spaced locations on said nonwoven carrier.

5. An improved vegetation element according to claim 1 wherein said vegetation carrier layer (a) and said seed mat (b) are mechanically attached.

6. An improved vegetation element according to claim 1 wherein said vegetation carrier layer (a) and said seed mat (b) are attached by the use of a plant-compatible adhesive.

7. An improved vegetation element according to claim 1 wherein said vegetation carrier layer (a) and said seed mat (b) are attached through the placement of air-permeable loading to the upper surface of said seed mat (b).

8. An improved vegetation element according to claim 7 wherein said air-permeable loading to the upper surface of said seed mat (b) is gravel.

9. An improved vegetation element according to claim 7 wherein said air-permeable loading to the upper surface of said seed mat (b) is sand and/or rock chips.

10. An improved vegetation element according to claim 1 wherein said seed mat (b) is positioned and attached between two distinct layers of vegetation carrier layer (a).

11. An improved vegetation element according to claim 1 wherein said seed mat (b) additionally contains fertilizer.

12. An improved vegetation element according to claim 1 wherein said seed mat (b) additionally contains fertilizer that is uniformly distributed within said set mat or is uniformly distributed on the surface of said seed mat.

13. An improved vegetation element according to claim 1 wherein said vegetation element additionally includes a carrier layer attached to said lower surface of said vegetation element.

\* \* \* \* \*